May 28, 1968 — W. G. SMITH — 3,385,105
ROLL TIGHTNESS TESTER
Filed Oct. 22, 1965

ROLL END

MATERIAL

INVENTOR
WILLIAM G. SMITH
BY Fetherstonhaugh & Co
ATTORNEYS

United States Patent Office 3,385,105
Patented May 28, 1968

3,385,105
ROLL TIGHTNESS TESTER
William G. Smith, Corner Brook, Newfoundland, Canada, assignor of one-half to Wieslow D. Markowski, Exton, Pa.
Filed Oct. 22, 1965, Ser. No. 502,002
Claims priority, application Canada, Aug. 18, 1965, 938,479
2 Claims. (Cl. 73—159)

ABSTRACT OF THE DISCLOSURE

A method and apparatus for determining a measure of tightness of the winding of a roll of material such as a paper roll by inserting the tapered probe into the end of a roll, axially loading the probe to an equilibrium position of penetration where the axial resistance is equal to the applied load and indicating the tightness of the material as a function of probe penetration. The apparatus generally comprises a body member with an indicator mounted thereon, which indicator has a slightly tapered conical probe spring urged outwardly of the body, a sleeve being provided to surround the probe and an outer skirt to surround the sleeve; spring means being provided for urging the skirt outwardly of the body. When a measure is taken the skirt is retracted and permits the probe to penetrate the layers of the roll and the tightness is indicated on the indicator as a measure of probe penetration.

---

This invention relates to a method to directly determine a measure of the tightness with which rolls of material such as paper have been wound, and to an apparatus adapted to carry out the steps of the method.

In the preparation of such rolls of material, determination of winding tightness is important, in order to compare the tightness of rolls and to check the uniformity of tightness of individual rolls from their core outward. No method is presently known which permits a measure of the relative tightness of a roll to be directly determined.

An object of the present invention is to measure the tightness of a penetrable material as a function of its resistance to the penetration of a tapered probe.

A further object of the present invention is to measure the tightness of the coils of a coil of material such as paper.

A further object is to provide a device having a tapered probe for insertion into a penetrable material and means to indicate the tightness of the material as a function of the penetration of the probe into the material.

Accordingly the present invention provides a method of testing the tightness of a coiled material such as paper using a conical probe comprising the steps of inserting the probe in the direction of taper into the end face of a mass of material being tested, resiliently loading the probe to an equilibrium position of penetration where the axial resistance of the material equals the applied resilient load, and directly measuring the tightness of the material as a function of the penetration of the probe into the material.

According to a feature of the invention there is provided an apparatus for carrying out the steps of the method which apparatus comprises a substantially conical axially elongated probe; means to apply an axial load to the probe to produce limited penetration of the probe into penetrable material to be tested; and means to directly indicate a measure of the tightness of the material as a function of the penetration of the probe within the material.

Figure 1:
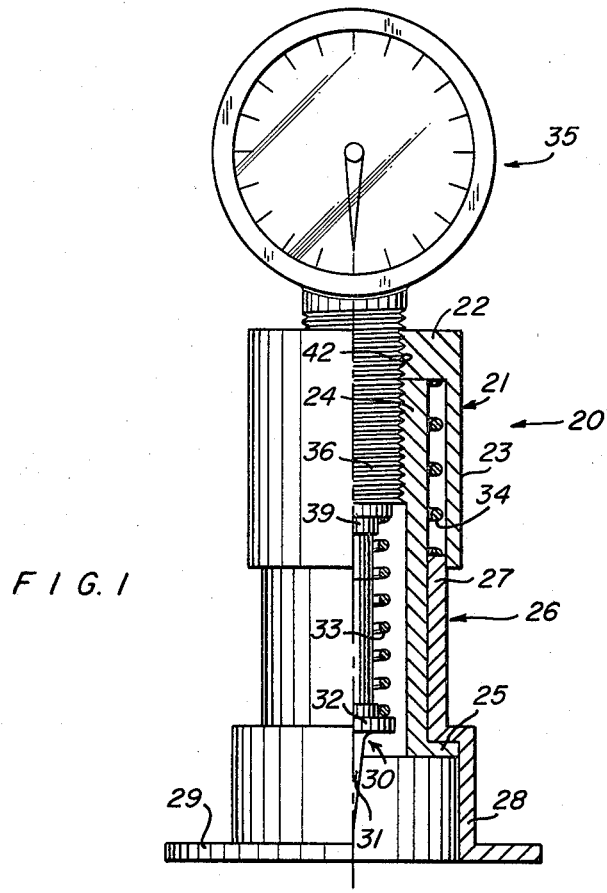
Figure 2:
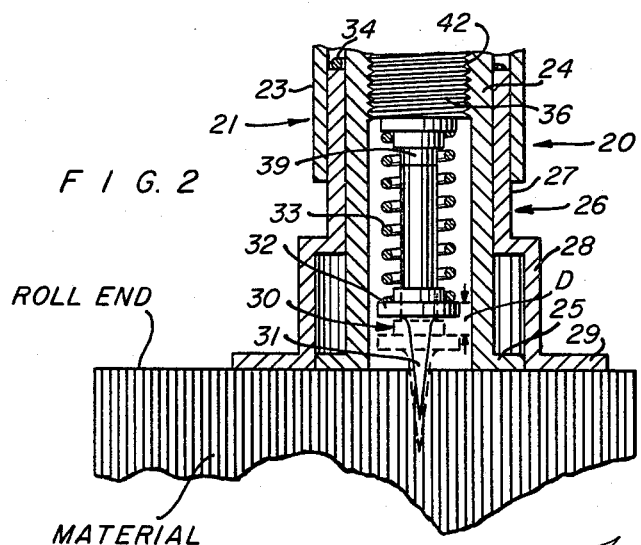

The following is a description by way of example of one embodiment in accordance with the present invention, reference being made to the accompanying drawings in which:

FIGURE 1 is a part section side view of the device in the inoperative position; and FIGURE 2 is a sectioned side view with the device held in the operative position against the end of a roll of material.

Referring to FIGURE 1 the tightness tester 20 comprises a body 21 having a dial indicator 35 mounted thereto, a probe member 30 being attached to the spindle member 39 of the dial indicator. A protective member 26 is slidably mounted in the body 21, and extends in protective manner beyond the end 31 of the probe 30 when the comparator is not being used.

The body 21 of the tester has a top portion 22 and a barrel portion 23 extending axially therefrom, the top portion 22 having a threaded bore 42 therethrough for the insertion of the threaded body of the dial indicator.

The protective member 26 has a cylindrical sliding portion 27 slidably mounted within the barrel 23 of the body 21. A stepped skirt 28 forms the lower end of the sliding portion 27, and carries a flange 29 at its outer end to provide an enlarged surface for bearing against the end of the roll being tested.

A sleeve 24 inserted within protective member 26 is shown threadedly attached to the attachment body 36 of the dial indicator 35 and locked in place against the underside of portion 22 of body 21. The sleeve 24 has a collar 25 extending radially at its lower end, which abuts against the step portion of the skirt 28 so as to limit the outermost position of the protective member 26. A coil spring 34 is located within an annular space provided between the barrel 23 and the sleeve 24, and serves to maintain the skirt 28 in its downward or protective position, relative to the probe end 31.

The probe end 31 is conical, being a cone having an included angle of about ten degrees in the illustrated embodiment, and having the tip of the probe appropriately radiused. The probe 30 is axially positioned by the compression spring 33.

In operation of the tester, the flange 29 is pressed firmly against the end of the roll to be measured, as shown in FIGURE 2 compressing the spring 34 until the collar 25 comes to rest against the roll end as shown. The probe end 31 penetrates between adjacent layers of the material until a position of equilibrium is reached in which the axial component of reaction forces from the roll material, acting on the tapered surface of the probe end 31 equals the axial force exerted by the spring 33, in its now partially compressed condition indicated by D in FIGURE 2.

The compression of spring 33 is a direct function of the tightness of the roll, the actual value of probe penetration being indicated by the dial test indicator.

Thus the probe penetration under known conditions of load which depend upon the characteristics of spring 33 produce a reading on the dial of the tester which can be considered as a measure of the tightness of the roll.

It will be seen that the stiffness of the spring 33 can be selected to provide a desired range of roll tightness measurement. Precompression of the spring 33 can also be effected by adjustment of the distance between the shoulder 32 of the probe member 30 and the end of the attachment body 36 which is abutted by the spring 33. Further adjustment may be made by moving part 21 on its thread toward or away from the point of probe 31.

The dial test indicator 35 may possess a separate pointer return spring, not shown, which returns the pointer to its initial position when load is removed. The effect of this weak return spring on the position of the probe end 31 under roll testing conditions is generally so small relative to the force exerted by the spring 33 that it may be ignored or the internal spring may be made to replace the external one. The value of tightness of winding as shown by the tester provides an arbitrarily selected measure of comparison, which is readily determined, and is of significance in winding materials into rolls of the desired tightness.

While a particular example of the present invention has been described it will be understood that the invention is capable of modification and variation without departing from the principles of the invention and the scope of the claims.

What I claim as my invention is:

1. A method for determining the tightness of a roll of paper as a measure of the penetration of a tapered probe axially into the roll comprising the steps of inserting the probe in the direction of taper into the end of the roll at a desired radial location, axially loading the probe to an equilibrium position of penetration where the axial resistance of the fibrous material equals the applied resilient load, and directly indicating the tightness of the material as a function of the penetration of the probe into the roll.

2. A device for providing an indication of the measure of the tightness of a roll of paper, or other wound material, comprising a body member; an indicator mounted on said body member and having a slightly tapered conical probe extending axially thereof; first spring means for biasing said probe outwardly of said body; a sleeve attached to said body spaced inwardly thereof and surrounding said probe; an outwardly directed flange at the outermost end of said sleeve; a skirt mounted on the body member for axial movement relative thereto between an inner stopped position where the probe is exposed and an outer stopped position where the probe is protected by the skirt; an outwardly directed step on said skirt; and second spring means for urging said skirt outwardly of said body; said step and said flange co-operating to provide the stop for the skirt in its outer position and said flange co-operating with the skirt to provide a base for the device when in operation; forceful application of the skirt against the end of a roll to be measured causing limited retraction of the skirt against the bias of the second spring means to permit penetration of the probe between layers of the roll to an extent determined by the tightness thereof, whereby to indicate the tightness of the roll on the indicator as a measure of probe penetration.

References Cited

UNITED STATES PATENTS

| | | | |
|---|---|---|---|
| 1,874,842 | 8/1932 | Abrahamson | 73—81 |
| 2,421,449 | 6/1947 | Zuber | 73—81 |
| 2,446,956 | 8/1948 | Ross | 73—81 |
| 2,723,554 | 11/1955 | Berlin et al. | |
| 3,078,710 | 2/1963 | Palmer | 73—81 |

DAVID SCHONBERG, *Primary Examiner.*

LOUIS R. PRINCE, *Examiner.*

J. NOLTON, *Assistant Examiner.*